Patented Sept. 7, 1937

2,092,713

UNITED STATES PATENT OFFICE 2,092,713

SYNTHETIC PRODUCT AND PROCESS OF MAKING SAME

Carleton Ellis, Montclair, N. J., assignor to Ellis-Foster Company, a corporation of New Jersey No Drawing. Application May 23, 1927, Serial No. 193,726

4 Claims. (Cl. 260—8)

This invention relates to synthetic products and to the process of making same and relates in particular to products generally appearing in the form of resins, gums or balsams and prepared by reacting on a glyceride with a glycol and an organic acid.

The glyceride preferred in carrying out the invention is a semi-drying oil such as corn, cottonseed, soya bean, or a non-drying oil such as peanut, lard and a neatsfoot, or drying oils such as linseed, tung and fish or whale oil. These oils may be employed in their crude or highly refined forms or intermediate stages of purification. The raw oils containing a considerable amount of free fatty acid may be used in some cases, or mixtures of the glyceride and fatty acids derived from glyceride oils by saponification, and the like. Mixtures of these various oils may be employed.

The organic acid employed preferably is one with a much lower number of carbon atoms than is present in the fatty acids derived from the glyceride oils of nature. Organic acids of from 3 or 4, up to 8 or 10 carbon atoms, or their anhydrides may be used advantageously. These acids in the main are differentiated from the glyceride oils by being crystalline or having definite crystalline modifications. Thus, phthalic anhydride, which is a typical acid of the present group is a crystalline product.

The glycol which I prefer to employ is a somewhat complex one formed by uniting two molecules of ethylene glycol to produce a glycol ether, known in the trade as diethylene glycol (dihydroxy ethyl ether). This glycol is a good solvent and has the advantage that when the completed resin or balsam is to be used with nitrocellulose in making lacquers and other coating compositions, and the like, this glycol is a solvent for nitrocellulose and therefore if an excess be employed in making the synthetic product of the present invention, it does not have an unfavorable effect upon the solubility of the nitrocellulose.

When, for example, vegetable oils, glycerol, and an organic acid such as phthalic anhydride, are heated for the purpose of causing reaction of these ingredients to make a resin or balsam, the oil does not enter into adequate combination prior to the setting in of a stage of polymerization of the glycerol phthalate which has formed, thereby giving a mixture of an insoluble resin impregnated with oily material and unfit for most uses directed to the production of soluble coating compositions.

According to the present invention, the reaction may be carried to the point of adequate combination from the standpoint of the coating composition industry, this stage being indicated by the acid number.

The following mixture was prepared: (6204)

| | Parts |
|---|---|
| Light colored linseed oil | 90 |
| Diethylene glycol | 106 |
| Phthalic anhydride | 148 |

These proportions are by weight.

The mixture was heated with agitation and an air-cooled reflux condenser was attached to the heating receptacle, the length of this condenser being such that water vapor could readily escape, while the glycol was retained. The temperature was carried to 200° C. in a period of about 10 or 15 minutes. The reaction mixture at first was cloudy resembling an emulsion, but on raising the temperature to 250° C. the turbidity disappeared and the linseed oil went into combination with the glycol phthalate. The temperature was carried to 290° C. and it was observed that polymerization to an insoluble, infusible material did not occur. Instead, a resinous balsam, which was transparent was obtained. The balsam was soluble in toluol and its acid number was found to be 23.4. This low acid number indicates an advanced stage of reaction. Nevertheless, the product was completely soluble in a number of organic solvents.

The reaction may be carried out as indicated above, with the several components heated together, or may be conducted in stages, first forming the glycol derivative and then adding the glyceride oil and carrying the reaction on until the oil has combined sufficiently.

In another case the following mixture was prepared; proportions given being by weight: (6205)

| | Parts |
|---|---|
| Refined cottonseed oil | 80 |
| Phthalic anhydride | 148 |
| Glycerol | 32 |
| Diethylene glycol | 53 |

The mixture was heated in the same manner as set forth above, but no infusible polymer formed. The cottonseed oil required a somewhat higher temperature to enter into combination with the other components and a clear melt was not obtained until the temperature reached about 310° C. The temperature was carried finally to 320° C. without infusible bodies forming. The product was found to be soluble in various solvents and mixtures of solvents. It was soluble in a hydrocarbon such as toluol. The product is a tough, gummy substance of light brown color. It is compatible with nitrocellulose. The acid number of this synthetic product was 27.5.

This application is a continuation in part of Serial Nos. 22,882 filed April 13, 1925 and 61,839 now Patent No. 2,072,068, and embraces the various glycols, oils and organic acids set forth therein.

The term "product of the resin-gum-balsam group" is intended to cover a product in the form of a resin, gum or balsam.

What I claim is:

1. A toluol-soluble product of the resin-gum-balsam group comprising the reaction products of a glyceride oil, glycol and glycerol, and a crystalline organic acid of a resinifying character.

2. An alkyd type resin formed by the combination and condensation of a mixture containing an organic polybasic acid, a polyhydric alcohol, one of the ethylene glycols and a fatty acid.

3. An alkyd type resin formed by the combination and condensation of a mixture containing phthalic anhydride, glycerine, one of the ethylene glycols and a fatty acid.

4. The process of producing the herein described resinous product which comprises heating a mixture containing an organic polybasic acid, glycerine, one of the ethylene glycols and a fatty acid.

CARLETON ELLIS.